United States Patent
Huang et al.

(10) Patent No.: US 10,706,217 B2
(45) Date of Patent: Jul. 7, 2020

(54) QUICK ACCESS PANEL FOR DISPLAYING A WEB PAGE ON A MOBILE DEVICE

(71) Applicant: International Business Machines Corporation, Armonk, NY (US)

(72) Inventors: Cheng Huang, Shanghai (CN); Yu Liu, Shanghai (CN); Jian Jun Wang, Shanghai (CN); Yi Ren Yuan, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 672 days.

(21) Appl. No.: 13/835,233

(22) Filed: Mar. 15, 2013

(65) Prior Publication Data

US 2013/0262982 A1  Oct. 3, 2013

(30) Foreign Application Priority Data

Mar. 28, 2012  (CN) .......................... 2012 1 0086448

(51) Int. Cl.
*G06F 17/22* (2006.01)
*G06F 40/14* (2020.01)
*G06F 16/957* (2019.01)

(52) U.S. Cl.
CPC ............ *G06F 40/14* (2020.01); *G06F 16/957* (2019.01)

(58) Field of Classification Search
CPC ...... G06F 17/24; G06F 17/25; G06F 17/2247; G06F 17/30899; G06T 11/60; A63F 2300/5553; A63F 2300/6623
USPC ................................ 715/201, 202, 230, 255
See application file for complete search history.

(56) References Cited

U.S. PATENT DOCUMENTS

| | | | | |
|---|---|---|---|---|
| 6,118,427 A | * | 9/2000 | Buxton | G06F 3/0481 345/629 |
| 7,487,448 B2 | * | 2/2009 | Emerson | G06F 17/218 707/999.104 |
| 2005/0208930 A1 | * | 9/2005 | Zmrzli | G06F 16/9577 455/414.4 |
| 2007/0073777 A1 | | 3/2007 | Werwath et al. | |
| 2007/0101279 A1 | * | 5/2007 | Chaudhri | G06F 3/0481 715/762 |

(Continued)

FOREIGN PATENT DOCUMENTS

| CN | 101388041 | 3/2009 |
|---|---|---|
| CN | 101388041 A | 3/2009 |

(Continued)

OTHER PUBLICATIONS

Disclosed Anonymously, "Dynamically Postioning User Controls on Smart Devices to Fit User's Hand Ergonomics Preference", IP.com Prior Art Database Disclosure, IP.com, IPCOM000212831, Nov. 29, 2011, 6 pages.

*Primary Examiner* — Andrew R Dyer
*Assistant Examiner* — Jenq-Kang Chu
(74) *Attorney, Agent, or Firm* — Cantor Colburn LLP; Christopher Pignato (57) ABSTRACT

Embodiments of displaying a web page on a mobile device are provided. An aspect includes acquiring user interface elements that have a quick access attribute in the web page. Another aspect includes generating a quick access panel of the user interface elements having the quick access attributes, wherein a visible transparency of the generated quick access panel is not below a predetermined threshold.

14 Claims, 4 Drawing Sheets

(56) References Cited

U.S. PATENT DOCUMENTS

| | | | |
|---|---|---|---|
| 2007/0174759 A1* | 7/2007 | Ando et al. | 715/500.1 |
| 2009/0132944 A1* | 5/2009 | Carr | G06F 17/30899 |
| | | | 715/769 |
| 2010/0188342 A1 | 7/2010 | Dunn | |
| 2010/0283744 A1 | 11/2010 | Nordenhake et al. | |
| 2012/0210247 A1* | 8/2012 | Khouri | G06Q 10/101 |
| | | | 715/751 |
| 2013/0014018 A1* | 1/2013 | Miner | H04L 67/1095 |
| | | | 715/736 |
| 2013/0033523 A1* | 2/2013 | Stovicek | G06F 16/9577 |
| | | | 345/649 |
| 2015/0067602 A1* | 3/2015 | Bernstein et al. | 715/823 |

FOREIGN PATENT DOCUMENTS

| | | |
|---|---|---|
| CN | 101706704 A | 5/2010 |
| CN | 102043786 | 5/2011 |
| WO | 2011033519 | 3/2011 |

\* cited by examiner

QUICK ACCESS PANEL FOR DISPLAYING A WEB PAGE ON A MOBILE DEVICE

CROSS-REFERENCE TO RELATED APPLICATION

The present application claims priority to Chinese Patent Application No. 201210086448.0, filed on Mar. 28, 2012, and all the benefits accruing therefrom under 35 U.S.C. § 119, the contents of which in its entirety are herein incorporated by reference.

BACKGROUND

This disclosure relates generally to mobile computing, and more specifically, to a quick access panel for displaying a web page on a mobile device.

As mobile devices with touch screen as input means become popular, various types of applications applicable to tablet electronic devices have been developed. In contrast to an electronic device that uses input means such as keyboard, mouse etc., a mobile device with touch screen as input means needs a user to use his/her finger to operate the screen for inputting. That is, a user may need to operate the mobile device while holding it. If size of the touch screen of the mobile device is large, frequently moving location of the finger for inputting is often not convenient. This problem gets even worse when the mobile device with touch screen as input means is used to browse a web page. Since web page browsing needs a great deal of interaction between the user and the mobile device, efficiency is usually not high.

SUMMARY

Methods, systems, and computer program products for displaying a web page on a mobile device are provided. An aspect includes acquiring user interface elements that have a quick access attribute in the web page. Another aspect includes generating a quick access panel of the user interface elements having the quick access attributes, wherein a visible transparency of the generated quick access panel is not below a predetermined threshold.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a quick access panel for displaying a web page on a mobile device are provided, with exemplary embodiments being discussed below in detail with reference to the accompanying drawings. According to an embodiment, there is provided a method for displaying a web page on a mobile device, comprising: acquiring user interface elements with quick access attributes in the web page; generating a quick access panel by using the user interface elements with quick access attribute, wherein the visible transparency of the generated quick access panel is not below a predetermined threshold. According to another embodiment, the method for displaying a web page on a mobile device comprises setting transparency of the quick access panel to be below the predetermined threshold in response to detecting input of a specific gesture.

According to an embodiment, there is provided a system for displaying a web page on a mobile device, comprising: an acquiring unit configured to acquire user interface elements with quick access attribute in the web page; a generating unit configured to generate a quick access panel by using the user interface elements with quick access attribute, wherein transparency of the generated quick access panel is not below a predetermined threshold.

Figure 1:
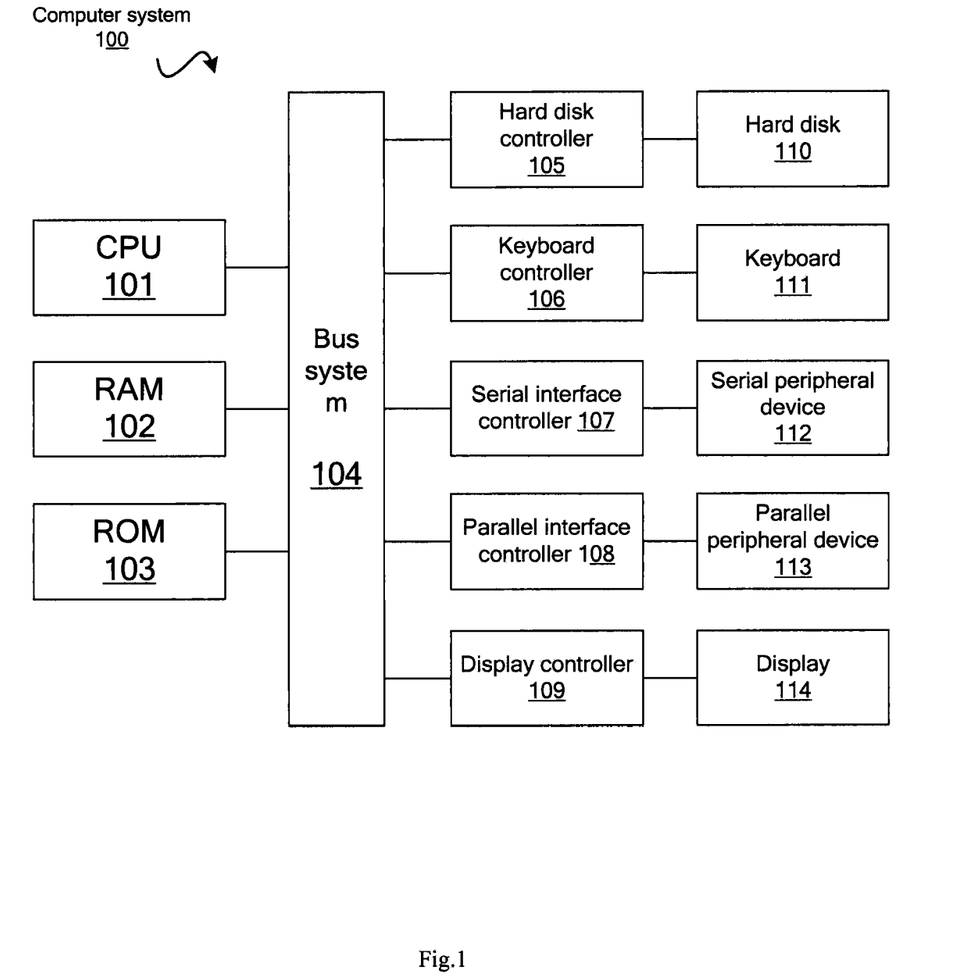
FIG. 1 shows a block diagram of an exemplary computer system for displaying a web page on a mobile device.

FIG. 1 shows a diagram of a computer system 100 which is applicable to implement various embodiments. As shown in FIG. 1, the computer system 100 may include: Central Processing Unit (CPU) 101, Random Access Memory (RAM) 102, Read Only Memory (ROM) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose. In some cases, some devices may be added to or removed from the computer system 100 based on specific situations.

Various embodiments may comprise a system, method or computer program product. Accordingly, some embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, various embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for various embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments are described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
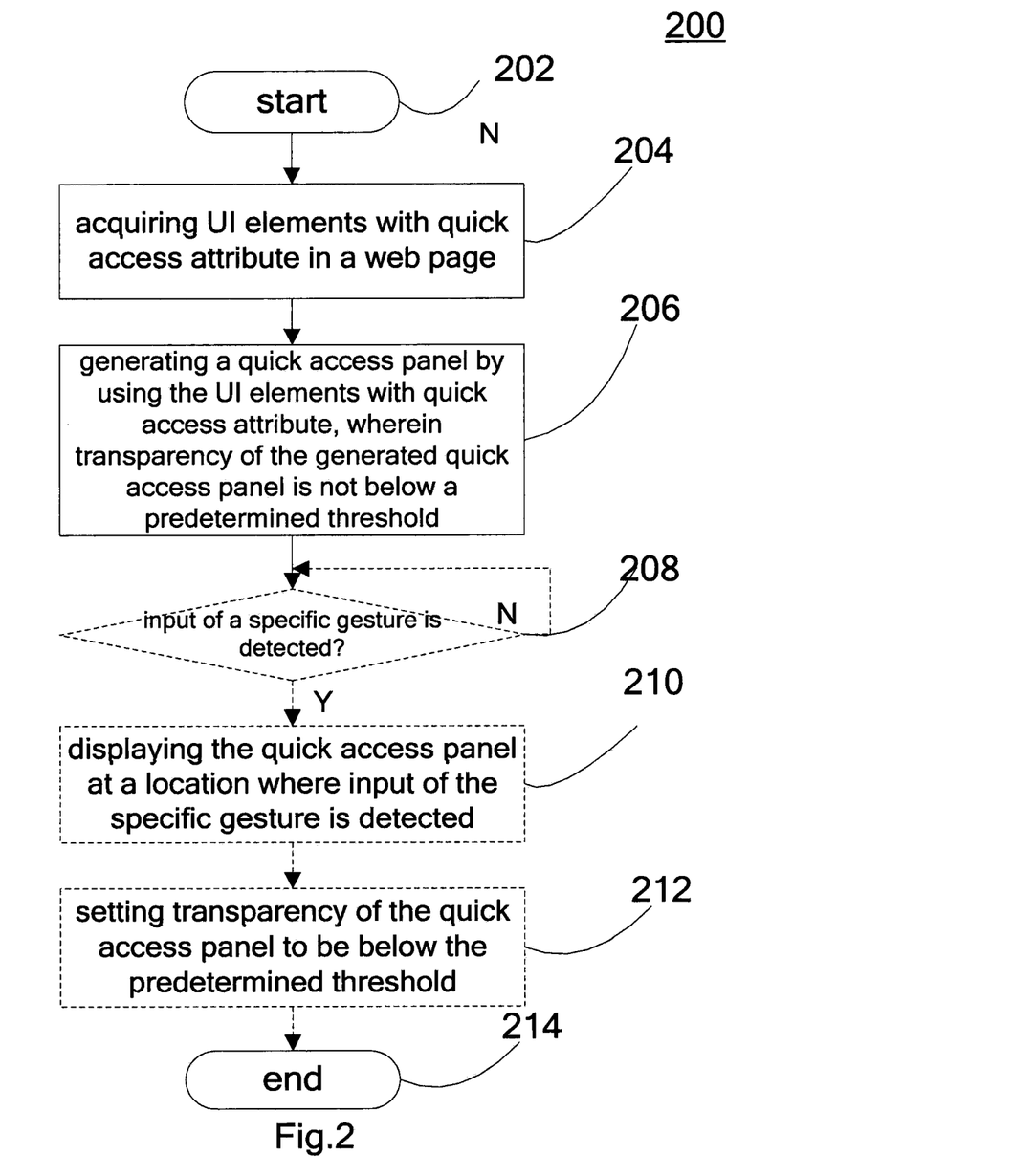
FIG. 2 shows a flowchart of a method for displaying a web page on a mobile device in accordance with an embodiment.

With reference now to FIG. 2, a flowchart of a method 200 for displaying a web page on a mobile device in accordance with an embodiment is shown. As shown in FIG. 2, the method 200 for displaying a web page on a mobile device in accordance with an embodiment begins with block 202. Then, the method 200 proceeds to block 204, where User Interface (UI) elements with having a quick access attribute in the web page are acquired. Usually, quick access attribute of an UI element refers to an action and/or event corresponding to that UI element, including but not limited to, quick access key (including specific key combinations for quick accessing), click, focus, select, mappable or not, draggable or not, etc. In accordance with an embodiment, a function for listening a web page load event may be defined, which may be executed in response to loading of web page codes. In accordance with an embodiment, the function first parses the loaded web page codes to generate a document object model (DOM) tree structure of the content corresponding to the web page codes. Then, the function may traverse the generated DOM tree structure to acquire UI elements with quick access attribute therein. The generated DOM tree structure may be traversed in depth first mode or breadth first mode. While the discussion below refers to a depth first mode as an example, those skilled in the art will appreciate that, breadth first mode is similar and description of which will be omitted here for brevity.

In an embodiment, the loaded web page code is as follows:

```
<html>
  <head>
    <title>Example</title>
  </head>
  <body>
    <div id=" content">
      <button id="view" mappable="true">View</button>
    </div>
  </body>
</html>
```

Figure 4A:
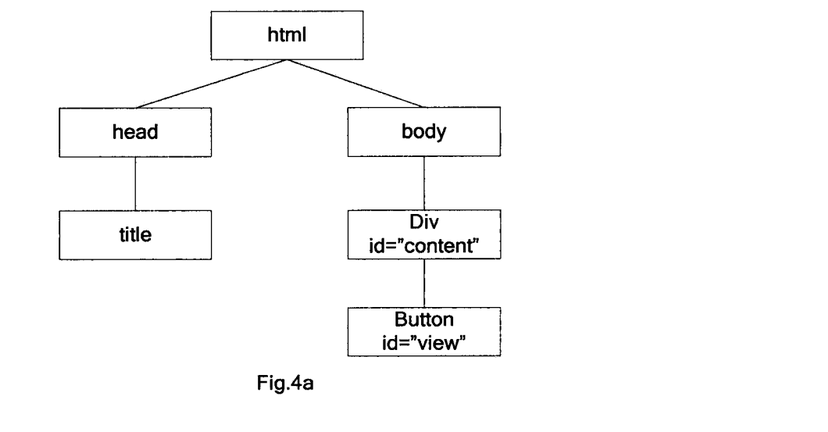
FIGS. 4a-4b shows a DOM tree structure corresponding to exemplary web page codes and sequence of traversing that DOM tree structure.

For the above web page codes, the DOM tree structure generated through parsing the codes by the function is as shown in FIG. 4*a*.

Figure 4B:
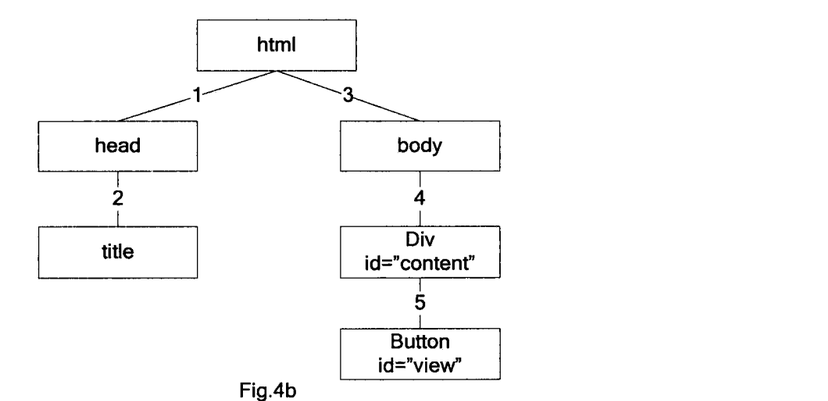

Then, a JavaScript object NodeIterator may be used to traverse through the whole DOM tree structure to search in depth first mode, starting from root node, and in turn reaching child nodes of the root node, child nodes of the child nodes until leaf nodes. Still taking the above web page codes for example, sequence of traversing through the DOM tree structure corresponding to the above web page codes by using the object NodeIterator is shown in FIG. 4*b*. The object NodeIterator may be created by invoking a method "createNodeIterator" with an object document, the "createNodeIterator" method may have four parameters, which may be invoked as follows:

Document.createNodeIterator(root,whatToShow,filter,entityReferenceExpansion)

Wherein:

root: root node of DOM tree structure, and is also a starting point for searching in depth first mode;

whatToShow: indicates what kind of node should be scanned;

filter: object NodeFilter, indicates what kind of node should be omitted; and entityReferenceExpansion: indicates whether element reference should be expanded.

Acquiring UI elements with quick access attribute in a web page may be realized by setting the above described parameters. The above description is combined with a specific application example, however, those skilled in the art will appreciate that, these description are merely illustrative, for example, the generated DOM tree structure may be traversed in breadth first mode to acquire UI elements with quick access attribute in a web page, and any other manners in the art may also be used to achieve the purpose of acquiring UI elements with quick access attribute in a web page.

In accordance with an embodiment, traversal of the DOM tree structure corresponding to the above web page codes may be realized through the following codes so as to acquire UI elements with quick access attribute therein.

```
Var iterator = document.createNodeIterator(document,
  NodeFilter.SHOW_ALL,
null, false);
  Var node = null;
  While(node) {
    Node = iterator.nextNode( );
    If(node has defined attribute) {
      f_add_to_panel(node);   //process specific node
    }
  }
```

Next, the method 200 proceeds to block 206, wherein a quick access panel is generated that includes all the UI elements with having a quick access attribute.

In accordance with an embodiment, a framework of the quick access panel may first be generated through the following codes:

```
var panel = document.createElement('div');
panel.style.display = 'none';   //hide the panel
//set styles, like width/height
document.appendChild(panel).
```

Next, UI elements corresponding to the acquired UI elements with quick access attribute in the web page are added into the framework of the quick access panel. This may be achieved by first creating UI elements in the framework of the quick access panel and then binding the UI elements with an event or creating a link to an event. For example, for a button with mappable quick access attribute, the above purpose of adding UI elements corresponding to the acquired UI elements with quick access attribute in a web page into the frame of the quick access panel may be realized through following codes:
<button mappable="true" class="save_btn" onclick="doSave( );">Save</button>.

Again, for example, if that button is referenced by multiple buttons, the above purpose of adding UI elements corresponding to the acquired UI elements with quick access attribute in a web page into the frame of the quick access panel may be realized through following codes.

```
var elem = document.createElement(btn.tagName);
elem.className = btn.getAttribute('class');
elem.onclick = btn.onclick;
panel.appendChild(elem);   //add element to panel
```

For example, for a quick access key or specific key combinations for quick accessing, this may be achieved by adding a shortcut corresponding thereto in the framework of the quick access panel.

Also, those skilled in the art will recognize that, the above description is merely illustrative, and any other manners in the art may be utilized to achieve the purpose of generating a quick access panel by using UI elements with quick access attribute.

In accordance with an embodiment, the visible transparency of the generated quick access panel is not below a predetermined threshold. The predetermined threshold may be 50%, for example. Further, the predetermined threshold may be dynamically adjusted according to brightness of an environment where the panel locates. This may be achieved by setting a display attribute of the Cascading Style Sheet (CSS) of the generated quick access panel. For example, a parameter of transparency value is added and set for the display attribute of CSS, e.g., transparency value may be 100% or 80%. Here, the purpose that transparency of the generated quick access panel is not below a predetermined threshold is to make influence on user's experience as less as possible. For example, when transparency value is 100%, a user is not aware that a quick access panel is being generated while loading the web page code, and the user's experience in browsing a web page will not be changed. Meanwhile, since a quick access panel is generated while loading the web page code, preparation has already been made for the frequent interaction been a user and a mobile device, thus it is capable of improving efficiency of interaction between the user and the mobile device.

Further, in accordance with another embodiment, the method 200 for displaying a web page on a mobile device further comprises a block 208, in which whether input of a specific gesture is detected is judged. If input of a specific gesture is detected, the method 200 proceeds to block 210, in which the quick access panel is displayed at a location where input of the specific gesture is detected. Gesture detection may be realized by using prior art, and the detected gesture is compared to a predetermined specific gesture, if match, then input of a specific gesture is considered to be detected and a quick access panel is displayed at a location where input of the specific gesture is detected in response to the match. The quick access panel may be displayed by using the location where input of the specific gesture is detected as central location of the quick access panel. Also, the quick access panel may be displayed by using the location where input of the specific gesture is detected as a start or end location of the quick access panel. Next, the method 200 proceeds to block 212, where transparency of the generated quick access panel is set to be below the predetermined threshold, which may be 50%, for example. This may be achieved by setting a display attribute of the CSS of the generated quick access panel. For example, a parameter of transparency value is added and set for the display attribute of CSS, e.g., transparency value may be 0% or 20%. As such, since the quick access panel is displayed at or near a location where user inputs a specific gesture, it is an optimal location for the user. Thus, efficiency of interaction between the user and the mobile device can be further improved.

In accordance with another embodiment, the method 200 for displaying a web page on a mobile device comprises: transparency of the quick access panel is reset to be not below the predetermined threshold in response to detecting a specific event. Here, the specific event is that input of a second specific gesture is detected, or that a predetermined amount of time has elapsed. Other events may also be employed as the specific event, which will not be described here for brevity. By using the above manner, influence of a quick access panel on user's experience in browsing a web page may be reduced.

Figure 3:
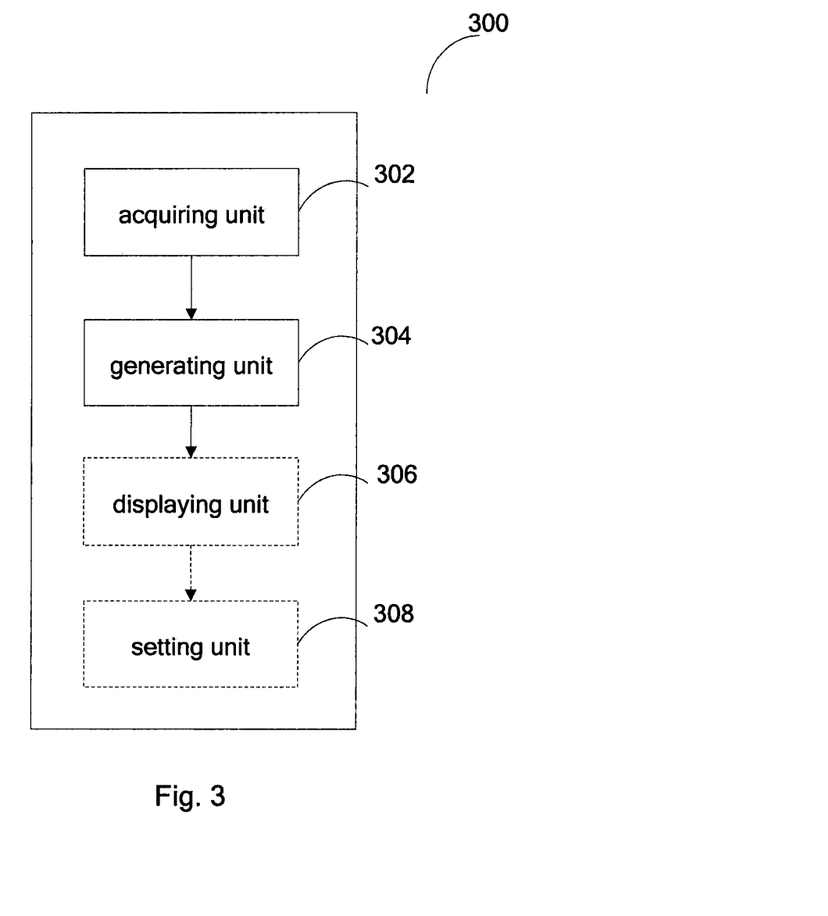
FIG. 3 shows a block diagram of a system for displaying a web page on a mobile device in accordance with an embodiment.

With reference now to FIG. 3, a block diagram of a system 300 for displaying a web page on a mobile device in accordance with an embodiment is shown. The system 300 for displaying a web page on a mobile device in accordance with an embodiment comprises: an acquiring unit 302 configured to acquire user interface elements with quick access attribute in the web page; a generating unit 304 configured to generate a quick access panel by using the user interface elements with quick access attribute; wherein, transparency of the generated quick access panel is not below a predetermined threshold.

In accordance with an embodiment, the system 300 further comprises: a displaying unit 306 configured to display the quick access panel at a location where input of a specific gesture is detected in response to detecting input of the specific gesture. In accordance with another embodiment, the system 300 further comprises: a setting unit 308 configured to set transparency of the quick access panel to be below the predetermined threshold. In accordance with an embodiment, the setting unit is configured to reset the transparency of the quick access panel to be not below the predetermined threshold in response to detecting a specific event, wherein the specific event is that input of a second specific gesture is detected, or that a predetermined amount of time has elapsed. Of course, other events may also be employed as the specific event, which will not be described here for brevity.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for displaying a web page on a mobile device, comprising:
   acquiring, via a processor, one or more user interface elements that have a quick access attribute in the web page, wherein the quick access attribute is indicative of click, focus, select, and whether the user interface element is draggable, wherein acquiring the user interface elements that have the quick access attribute in the web page comprises:
   loading the web page via the processor;
   determining, via the processor, web page codes based on the loading the web page;
   parsing, via the processor, the web page codes to generate a document object model (DOM) tree structure corresponding to the web page codes; and
   traversing, via the processor, the DOM tree structure to determine the one or more user interface elements in the web page that have the quick access attribute, wherein the quick access attribute comprises an action or event that is defined in a node of the DOM tree structure corresponding to the user interface element;
   generating, via the processor, a quick access panel of the one or more user interface elements having the quick access attribute, wherein the quick access panel comprises a link to the action or event; and
   wherein a visible transparency of the generated quick access panel is not below a predetermined threshold;
   displaying, via the processor, the quick access panel of the one or more user interface elements at a location on a display screen of the mobile device responsive to a user input of a specific gesture in to the mobile device, wherein the specific gesture comprises a start location and an end location;
   wherein the location on the display screen of the mobile device is between the start location and the end location;
   setting, via the processor, the visible transparency of the quick access panel to be below the predetermined threshold; and
   resetting, via the processor, the visible transparency of the quick access panel to be not below the predetermined threshold in response to detecting a specific event, wherein the specific event comprises a second user input of a second specific gesture in to the mobile device.

2. The computer-implemented method according to claim 1, wherein the specific event comprises detection of input of a second specific gesture.

3. The computer-implemented method according to claim 1, wherein the specific event comprises elapsing of a predetermined amount of time.

4. The computer-implemented method according to claim 1, wherein the quick access panel comprises a cascading style sheet (CSS).

5. The computer-implemented method according to claim 1, wherein the quick access attribute comprises a quick access key.

6. The computer-implemented method according to claim 1, wherein the quick access attribute comprises a click or select.

7. The computer-implemented method according to claim 1, wherein the document object model tree structure corresponding to the web page is parsed based, in part, on whether the user interface element is mappable or draggable, and whether the user interface element is referenced by multiple buttons.

8. A system for displaying a web page on a mobile device, comprising:
   an acquiring unit configured to acquire one or more user interface elements having a quick access attribute in the web page, wherein the quick access attribute is indicative of click, focus, select, and whether the user interface element is mappable or draggable, wherein acquiring the user interface elements that have the quick access attribute in the web page comprises:
   loading the web page;
   determining web page codes based on the loading the web page;
   parsing the web page codes to generate a document object model (DOM) tree structure corresponding to the web page codes; and
   traversing the DOM tree structure to determine the one or more user interface elements in the web page that have the quick access attribute, wherein the quick access panel comprises a link to the action or event and
wherein the quick access attribute comprises an action or event that is defined in a node of the DOM tree structure corresponding to the user interface element; and
a generating unit configured to generate a quick access panel of the one or more user interface elements with the quick access attribute, wherein a visible transparency of the generated quick access panel is not below a predetermined threshold;
a displaying unit configured to display the quick access panel of the one or more user interface elements at a location on a display screen of the mobile device responsive to a user input of a specific gesture in to the mobile device, wherein the specific gesture comprises a start location and an end location;
wherein the location on the display screen of the mobile device is between the start location and the end location;
a setting unit configured to set the visible transparency of the quick access panel to be below the predetermined threshold; and
wherein the setting unit is configured to reset the visible transparency of the quick access panel to be not below the predetermined threshold in response to detecting a specific event, wherein the specific event comprises a second user input of a second specific gesture in to the mobile device.

9. The system according to claim 8, wherein the specific event comprises detection of input of a second specific gesture.

10. The system according to claim 8, wherein the specific event comprises elapsing of a predetermined amount of time.

11. The system according to claim 8, wherein the quick access panel comprises a cascading style sheet (CSS).

12. A computer program product for displaying a web page on a mobile device, the computer program product comprising:
a non-transitory computer readable storage medium having computer readable program code embodied therewith, the computer readable program code comprising computer readable program code configured to:
acquire one or more user interface elements that have a quick access attribute in the web page, wherein acquiring the user interface elements that have the quick access attribute in the web page comprises:
loading the web page;
determining web page codes based on the loading the web page;
parsing the loaded web page codes to generate a document object model (DOM) tree structure corresponding to the web page codes; and
traversing the DOM tree structure to determine the one or more user interface elements in the web page that have the quick access attribute, wherein the quick access panel comprises a link to the action or event; and
wherein the quick access attribute comprises an action or event that is defined in a node of the DOM tree structure corresponding to the user interface element;
generate a quick access panel of the one or more user interface elements having the quick access attribute, wherein a visible transparency of the generated quick access panel is not below a predetermined threshold;
display the quick access panel of the one or more user interface elements at a location on a display screen of the mobile device responsive to a user input of a specific gesture in to the mobile device, wherein the specific gesture comprises a start location and an end location;
wherein the location on the display screen of the mobile device is between the start location and the end location;
setting, via the processor, the visible transparency of the quick access panel to be below the predetermined threshold; and
resetting, via the processor, the visible transparency of the quick access panel to be not below the predetermined threshold in response to detecting a specific event, wherein the specific event comprises a second user input of a second specific gesture in to the mobile device.

13. The computer program product according to claim 12, wherein the specific event comprises detection of input of a second specific gesture.

14. The computer program product according to claim 12, wherein the specific event comprises elapsing of a predetermined amount of time.

* * * * *